(12) United States Patent
Scherzer et al.

(10) Patent No.: US 9,962,889 B2
(45) Date of Patent: May 8, 2018

(54) METHOD FOR PRODUCING FIBER-REINFORCED COMPOSITE MATERIALS FROM POLYAMIDE 6 AND COPOLYAMIDES MADE OF POLYAMIDE 6 AND POLYAMIDE 12

(75) Inventors: Dietrich Scherzer, Neustadt (DE); Gad Kory, Gaiberg (DE); Martin Weber, Maikammer (DE)

(73) Assignee: BASF SE, Ludwigshafen Am Rhein (DE)

( * ) Notice: Subject to any disclaimer, the term of this patent is extended or adjusted under 35 U.S.C. 154(b) by 287 days.

(21) Appl. No.: 13/382,782

(22) PCT Filed: Jul. 6, 2010

(86) PCT No.: PCT/EP2010/059628
§ 371 (c)(1),
(2), (4) Date: Jan. 6, 2012

(87) PCT Pub. No.: WO2011/003900
PCT Pub. Date: Jan. 13, 2011

(65) Prior Publication Data
US 2012/0107509 A1 May 3, 2012

(30) Foreign Application Priority Data
Jul. 8, 2009 (EP) .................... 09164863

(51) Int. Cl.
| | | |
|---|---|---|
| *B05D 3/02* | (2006.01) | |
| *B29C 70/52* | (2006.01) | |
| *B29C 67/24* | (2006.01) | |
| *C08J 5/24* | (2006.01) | |
| *B29B 15/12* | (2006.01) | |
| *B29K 77/00* | (2006.01) | |

(52) U.S. Cl.
CPC .......... *B29C 70/521* (2013.01); *B29B 15/125* (2013.01); *B29C 67/246* (2013.01); *C08J 5/24* (2013.01); *B29K 2077/00* (2013.01); *C08J 2377/02* (2013.01)

(58) Field of Classification Search
USPC ......................................... 427/381
See application file for complete search history.

(56) References Cited

U.S. PATENT DOCUMENTS

| | | | |
|---|---|---|---|
| 5,098,496 A | | 3/1992 | Breitigam et al. |
| 5,294,461 A | * | 3/1994 | Ishida ........................ 427/293 |
| 5,310,600 A | * | 5/1994 | Tsuya et al. ................ 428/378 |
| 5,424,388 A | | 6/1995 | Chen et al. |
| 5,679,456 A | * | 10/1997 | Sakai ........................ B29B 9/14 428/189 |
| 5,773,555 A | | 6/1998 | Weger et al. |
| 5,837,181 A | | 11/1998 | Leimbacher et al. |
| 5,895,808 A | | 4/1999 | Schmid et al. |
| 7,898,022 B2 | | 3/2011 | Bhattacharyya et al. |
| 8,051,767 B2 | | 11/2011 | Gerber et al. |
| 8,066,160 B2 | | 11/2011 | Sakane et al. |
| 2005/0214465 A1 | | 9/2005 | Maskus et al. |
| 2010/0089258 A1 | | 4/2010 | Bosga |
| 2010/0184898 A1 | | 7/2010 | Weber et al. |
| 2010/0190897 A1 | | 7/2010 | Maletzko et al. |
| 2010/0197859 A1 | | 8/2010 | Weber et al. |
| 2010/0286203 A1 | | 11/2010 | Weber et al. |
| 2010/0310833 A1 | | 12/2010 | Scherzer et al. |
| 2011/0009566 A1 | | 1/2011 | Jain et al. |
| 2011/0009877 A1 | | 1/2011 | Thenuwara et al. |
| 2011/0029106 A1 | | 2/2011 | Isberg et al. |
| 2011/0051197 A1 | | 3/2011 | Yao et al. |
| 2011/0059109 A1 | | 3/2011 | Smith et al. |
| 2011/0092645 A1 | | 4/2011 | Loth et al. |
| 2011/0098372 A1 | | 4/2011 | Aulenta et al. |
| 2011/0155309 A1 | | 6/2011 | Steininger et al. |
| 2011/0178205 A1 | | 7/2011 | Weber et al. |
| 2011/0196098 A1 | | 8/2011 | Mettlach et al. |
| 2011/0201728 A1 | | 8/2011 | Yamamoto et al. |
| 2011/0201747 A1 | | 8/2011 | Weber et al. |
| 2011/0218294 A1 | | 9/2011 | Weber et al. |
| 2011/0224386 A1 | | 9/2011 | Weber et al. |
| 2011/0237693 A1 | | 9/2011 | Weber et al. |
| 2011/0237694 A1 | | 9/2011 | Weber et al. |
| 2011/0244743 A1 | | 10/2011 | Scherzer et al. |

(Continued)

FOREIGN PATENT DOCUMENTS

| | | |
|---|---|---|
| DE | 102007031467 A1 | 1/2009 |
| DE | 102010040027 A1 | 3/2012 |

(Continued)

OTHER PUBLICATIONS

U.S. Appl. No. 13/504,717, filed Apr. 27, 2012, Weber et al.
Luiser, et al. "Reaction injection pultrusion of PA12 composites: process and modeling", composites: Part A (2003) 583-595.
U.S. Appl. No. 61/316,848.
U.S. Appl. No. 13/267,628, filed Oct. 6, 2011, Scherzer et al.
U.S. Appl. No. 13/376,665, filed Dec. 7, 2011, Weber et al.
U.S. Appl. No. 13/376,901, filed Dec. 8, 2011, Gibon et al.

(Continued)

*Primary Examiner* — Nathan H Empie
(74) *Attorney, Agent, or Firm* — Drinker Biddle & Reath LLP

(57) ABSTRACT

The present invention relates to a method for producing fiber-reinforced composite materials, in which a multiplicity of continuous filaments or woven fabric is impregnated optionally together with reinforcing materials, comprising caprolactam and other starting materials for polyamide 6 or other starting materials for copolymers of caprolactam, passed through at temperatures of 70 to 100° C., and anionically polymerized at temperatures of 100 to 190° C., and optionally repolymerized at temperatures of 90 to 170° C.

17 Claims, No Drawings

(56) References Cited

U.S. PATENT DOCUMENTS

| | | |
|---|---|---|
| 2011/0251337 A1 | 10/2011 | Weber et al. |
| 2011/0288258 A1 | 11/2011 | Desbois et al. |
| 2011/0294912 A1 | 12/2011 | Weber et al. |
| 2011/0306718 A1 | 12/2011 | Scherzer et al. |
| 2011/0319550 A1 | 12/2011 | Weber et al. |
| 2012/0088048 A1 | 4/2012 | Scherzer et al. |
| 2012/0108693 A1 | 5/2012 | Gibon et al. |

FOREIGN PATENT DOCUMENTS

| | | |
|---|---|---|
| EP | 56 703 A1 | 7/1982 |
| EP | 0384063 A2 | 8/1990 |
| EP | 579 047 A1 | 1/1994 |
| EP | 0732351 A2 | 9/1996 |
| EP | 0752306 A1 | 1/1997 |
| EP | 0755966 A1 | 1/1997 |
| EP | 0791618 A2 | 8/1997 |
| GB | 1265383 A * | 3/1972 |
| WO | WO-03/053661 A1 | 7/2003 |
| WO | WO 2009/003901 | 1/2009 |
| WO | WO 2009/034114 | 3/2009 |
| WO | WO 2010/089241 | 8/2010 |
| WO | PCT/EP2010/069644 | 12/2010 |
| WO | WO 2011/000816 | 1/2011 |
| WO | WO 2011/009798 | 1/2011 |
| WO | WO 2011/051273 | 5/2011 |
| WO | WO 2011/069892 | 6/2011 |
| WO | WO 2011/073196 | 6/2011 |
| WO | WO 2011/073197 | 6/2011 |
| WO | WO 2011/117344 | 9/2011 |

OTHER PUBLICATIONS

U.S. Appl. No. 13/377,979, filed Dec. 13, 2011, Khvorost et al.
U.S. Appl. No. 13/391,082, filed Feb. 17, 2012, Shahim et al.
U.S. Appl. No. 13/378,980, filed Mar. 1, 2012, Schmidt et al.

* cited by examiner

METHOD FOR PRODUCING FIBER-REINFORCED COMPOSITE MATERIALS FROM POLYAMIDE 6 AND COPOLYAMIDES MADE OF POLYAMIDE 6 AND POLYAMIDE 12

CROSS-REFERENCE TO RELATED APPLICATIONS

This application is a national stage application (under 35 U.S.C. § 371) of PCT/EP2010/059628, filed Jul. 6, 2010, which claims benefit of European application 09164863.4, filed Jul. 8, 2009, the contents of each of which are incorporated herein by reference in their entireties.

FIELD OF THE INVENTION

The present invention relates to a method for producing a fiber-reinforced composite material from polyamide 6 and copolyamides of polyamide 6 and polyamide 12

BACKGROUND

EP-A-56 703 and EP-A-579 047 have already disclosed components and granules, respectively, made from a fiber-reinforced thermoplastic, and their production by pultrusion, in which a strand of fibers is wetted with a melted polymer.

DE-A-10 2007 031 467 discloses a method for producing a fiber-reinforced composite by passing a multiplicity of continuous filaments through a bath comprising caprolactam and other starting materials for polyamide 6 and wetting them, introducing the wetted continuous filaments into an oven, in which caprolactam is polymerized anionically at 230° C. to form polyamide 6 adhering to the continuous filaments.

Disadvantages of the method cited above are that the fiber wetting is unsatisfactory and the level of residual monomers and oligomers is high.

BRIEF SUMMARY

Found accordingly has been a new and improved method for producing fiber-reinforced composite materials, wherein a multiplicity of continuous filaments or woven fabric is impregnated optionally together with reinforcing materials, comprising caprolactam and other starting materials for polyamide 6 or other copolyamides, passed through at temperatures of 70 to 100° C., and anionically polymerized at temperatures of 100 to 190° C., and optionally repolymerized at temperatures of 90 to 170° C.

Another improved method for producing fiber-reinforced composite materials has been found, wherein a multiplicity of continuous filaments or woven fabric, optionally together with reinforcing materials, comprising caprolactam and other starting materials for polyamide 6 or other copolyamides, is impregnated, passed through above the melting temperature of the system at temperatures of 70 to 100° C., and, at temperatures below the melting temperature of the system, below 70° C., cooled as prepregs in the form of panels or in wound form. These prepregs can later, in a compression mold or in another suitable tool, be anionically polymerized at temperatures of 100 to 190° C. and optionally repolymerized at temperatures of 90 to 170° C.

DETAILED DESCRIPTION OF THE PREFERRED EMBODIMENTS

The method of the invention can be implemented as follows:

The method of the invention can be implemented as either an open or a closed method, preferably as an open method.

With the open method, the fibers or woven fabrics, optionally with reinforcing material, can be passed via a dip roll from their racks (holding creels of fiber) through a bath or into an impregnating trough. Optionally it is possible for carding grids to be used to ensure the desired distribution of the fibers in the subsequent composite material. In such a case, the reinforcing material might optionally be introduced after the carding grid. The fibers, optionally with reinforcing material, can be impregnated in an impregnating trough with a mixture of caprolactam and other starting materials for polyamide 6 at temperatures beneath the polymerization temperature and above the melting point of the mixture, in other words at temperatures of 70 to 100° C., preferably 70 to 95° C., more preferably 70 to 90° C., anionically polymerized at temperatures of 100 to 190° C., preferably 100 to 160° C., more preferably 100 to 150° C., more particularly 100 to 130° C., and optionally repolymerized at temperatures of 100 to 170° C., preferably 100 to 160° C., more preferably 100 to 150° C., more particularly 100 to 130° C., and thereafter may travel through a plurality of preforming stations, which bring the fiber/resin mixture closer and closer to the ultimate desired shape.

With the closed method, after being impregnated with a mixture of caprolactam and other starting materials for polyamide 6 or other copolyamides, the entire fibers or woven fabrics, optionally with reinforcing material, then come into contact in the shaping die, albeit at an elevated pressure of 1.1 to 800 bar, preferably 1.5 to 10 bar, more particularly 2 to 5 bar—for example, in an impregnating trough or in a bath, at temperatures of 70 to 100° C., and are anionically polymerized at temperatures of 100 to 190° C., preferably 100 to 160° C., more preferably 100 to 150° C., more particularly 100 to 130° C., and optionally repolymerized at temperatures of 100 to 170° C., preferably 100 to 160° C., more preferably 100 to 150° C., more particularly 100 to 130° C., and thereafter may travel through a plurality of preforming stations, which take the fiber/resin mixture closer and closer to the ultimate desired form.

With large-volume composite materials, a constant or near-constant heat distribution should be ensured, in order to prevent cracks. The composite material thus cured can be subsequently sawn into any desired parts.

The entire process is kept in motion by means of a pulling tool in the form, for example, of a continuous-belt takeoff or winding, or by reversing hydraulic grippers; the tool pulls the completed composite material or prepreg and hence the fibers together with the polymer and, where present, the reinforcing material out of the curing tool.

The continuous strand wetted with polyamide can thereafter be wound up or else chopped to the desired length or pelletized.

A suitable caprolactam is preferably ε-caprolactam.

Up to 20% by weight, i.e., 0% to 20% by weight, preferably 0% to 17% by weight, more preferably 0% to 15% by weight of the caprolactam can be used by comonomers from the group of the lactams having at least 4 C atoms, particular preference being given to ω-laurolactam.

In one preferred embodiment, mixtures of ε-caprolactam and ω-laurolactam can be used. The mixing ratio is generally 1000:1, preferably 100:1, more preferably 10:1, more particularly 2:1.

Other suitable starting materials for polyamide 6 include activators, which can be prepared by reacting isocyanates, as for example HDI (hexamethylene diisocyanate) with lactams, as for example ε-caprolactam, and blocked isocyanates, isophthaloylbiscaprolactam, terephthaloylbiscaprolactam, esters such as dimethyl phthalate-polyethylene glycol, polyols or polydienes in combination with acid chlorides, carbonylbiscaprolactam, hexamethylene diisocyanate or acyllactamate, preferably isocyanates, hexamethylene diisocyanate or acyllactamate, more preferably hexamethylene diisocyanate or acyllactamate, and alkaline catalysts such as magnesium halolactamates, alkali metal caprolactamates, aluminum lactam or magnesium lactam, sodium caprolactamate or magnesium bromide lactamate, preferably alkali metal caprolactamates, aluminum lactam or magnesium lactam, sodium caprolactamate or magnesium bromide lactamate, more preferably sodium caprolactamate or magnesium bromide lactamate.

Activators used can be all activators which are employed for activated anionic polymerization, examples thus being N-acyllactams, such as N-acetylcaprolactam, substituted triazines, carbodimides, cyanamides, mono- and polyisocyanates, and the corresponding blocked isocyanate compounds. The activators are employed preferably in concentrations of 0.1 to 1 mol %, based on the amount of lactam. With the catalysts of the invention it is possible to polymerize lactams having at least 5 ring members, such as, for example, caprolactam, laurolactam, caprylolactam, enantholactam, the corresponding C-substituted lactams or mixtures of the stated lactams.

The alkaline catalysts can be prepared by reacting the polyether with the corresponding alkali metal or alkaline earth metal compound, such as, for example, alkoxide, amide, hydride, Grignard compounds, and also the alkali metals or alkaline earth metals. The catalysts are added generally in amounts of 0.1% to 40% by weight, preferably 0.2% to 15% by weight, based on the lactam melt.

Highly suitable catalysts for the polymerization are potassium or sodium lactamates.

Especially suitable is sodium caprolactamate, which can be prepared easily from NaH and ε-caprolactam.

The mixing ratio of caprolactam, activator, and alkaline catalyst can be varied within wide limits; in general, the molar ratio of caprolactam to activator to alkaline catalyst is 1000:1:1 to 1000:200:50.

Suitable fibers include inorganic materials such as high-modulus carbon fibers, silicatic and nonsilicatic glasses of a wide variety of types, carbon, boron, silicon carbide, metals, metal alloys, metal oxides, metal nitrides, metal carbides, and silicates, and also organic materials such as natural and synthetic polymers, examples being polyacrylonitriles, polyesters, ultrastretched polyolefin fibers, polyamides, polyimides, aramids, liquid-crystal polymers, polyphenylene sulfides, polyether ketones, polyether ether ketones, polyetherimides, cotton, cellulose, and other natural fibers, examples being flax, sisal, kenaf, hemp, and abaca; preferably materials of high melting point, examples being glasses, carbon, aramids, liquid-crystal polymers, polyphenylene sulfides, polyether ketones, polyether ether ketones, and polyetherimides, more preferably glass, carbon, aramid, steel, ceramic and/or other sufficiently temperature-resistant polymeric fibers or filaments.

Suitable reinforcing material includes rovings of the aforementioned fibers, preferably nonlinear and linear, more preferably linear moldings such as fibers, yarns, twists, ropes, and textile structures, such as woven, knitted or braided fabrics and nonwovens, preferably fibers, yarns, and woven fabrics, more preferably fibers and yarns.

The amount of fibers in the completed composite material is generally 20% to 85% by volume, preferably 40% to 70% by volume; in the case of profiles with purely unidirectional reinforcement it is 30% to 90% by volume, preferably 40% to 80% by volume.

The reinforcing material can be introduced into the impregnating trough in a variety of ways. For example, it can be pulled in through a die with narrow play. The reinforcing material is preferably introduced into the melt chamber through a slot without wall contact.

The distribution of the reinforcing material within the composite material of the invention may be uniform; alternatively, the reinforcing material may also be present in a greater fraction in certain parts of the composite material, such as in the peripheral regions and/or in particular reinforcement zones, than in other parts of the composite material.

The geometrical form and the dimensions of the die can be varied within wide limits, allowing the production of composite materials (profiles, sheets or strips) having different forms and dimensions. Preference is given to strip profiles with diameters up to 500 mm, more particularly 200 mm, and rectangular profiles and circular profiles with widths of up to 2500 mm and thicknesses of up to 10 mm. Particularly preferred are thin strips with thicknesses up to 1 mm.

In addition, curved profiles or profiles which change in their form (such as hammer handles, for example) can be produced by means of specialty methods.

Comprehended by the term "composite material" are materials made of two or more substances bonded to one another, such as particulate composites (dispersion materials, fiber composites, layer composites (laminates), and interpenetrated composites, preferably fiber composites and layer composites (laminates), more preferably fiber composites.

Comprehended by the term "pultrusion" is a technique for producing composite materials such as fiber-reinforced plastics in the form of profiles in a discontinuous or continuous, preferably continuous, procedure.

The shapes of the profiles are diverse such as mats, sheets, tubes, supports such as T and double T supports, U, W, and UW profiles, molded parts, for example, for the automobile industry, for housings, grips, and handles for tools and sports equipment such as paddles or tennis racquets.

Fiber-reinforced composite materials, more particularly fiber-reinforced polyamides, are used for numerous applications, including for fiber-reinforced or fabric-reinforced plastics pellets, profiles or sheets, and also in injection moldings for the automobile industry and other industries. The fibers are used in the polymeric matrix with the aim of improving the mechanical properties, such as strength, stiffness, and impact toughness. The achievable properties are heavily dependent on the nature of the fiber and its length in the component, and also on the quality of dispersion of the fibers in the polymeric matrix. With regard to the mechanical properties, preference is given to using long and oriented fibers, more particularly glass fibers and carbon fibers.

EXAMPLES

Example 1 (Tests with Two Temperature Stages)

30 g (265 mmol) of ε-caprolactam were melted under a nitrogen atmosphere and stirred at a temperature T1 (RT1) while nitrogen was passed through the melt. The melt was then heated to temperature T2, 1.8 g (13.25 mmol=5 mol %) of sodium caprolactamate (20% strength by weight in caprolactam) (as catalyst) and, with vigorous stirring, 0.376 ml (2.42 mmol=0.9 mol %) of N-acetylcaprolactam (as activator) were added, and stirring was continued in accordance with the table for RT2. The resulting polyamide was assessed, demolded, comminuted, and analyzed.

The results are collated below in Table 1.

TABLE 1

| Example | T1 [° C.] | T2 [° C.] | Residence time [min] RT1 | RT2 | Monomer [%] | Dimer [%] | Trimer [%] | Quality of molding |
|---|---|---|---|---|---|---|---|---|
| 1a | 90 | 138 | 10 | 2 | 2.1 | 0.56 | 0.14 | good |
| 1b | 81 | 145 | 10 | 1 | 2.7 | 0.57 | 0.14 | good |
| Comp. 1c | 105 | 200 | 10 | <1 | 4.5 | 0.6 | 0.16 | poor |

Example 2 (Tests with Three Temperature Stages)

30 g (265 mmol) of ε-caprolactam were melted under a nitrogen atmosphere and stirred at a temperature T1 (RT1) while nitrogen was passed through the melt, and at a temperature T2, 1.8 g (13.25 mmol=5 mol %) of sodium caprolactamate (20% strength by weight in caprolactam) and, with vigorous stirring, 0.376 ml (2.42 mmol=0.9 mol %) of N-acetylcaprolactam were added, and stirring was continued in accordance with the table for RT2. The resulting polyamide was heat-treated at a temperature T3 for the time RT3, and subsequently taken out, assessed, comminuted, and analyzed.

The results are collated below in Table 2.

TABLE 2

| Example | T1 [° C.] | T2 [° C.] | T3 [° C.] | Residence time [min] RT1 | RT2 | RT3 | Monomer [%] | Dimer [%] | Trimer [%] | Quality of moldings |
|---|---|---|---|---|---|---|---|---|---|---|
| 2a | 90 | 138 | 110 | 10 | 2 | 20 | 1.9 | 0.55 | 0.14 | good |
| 2b | 81 | 145 | 130 | 10 | 1 | 20 | 2.6 | 0.56 | 0.14 | good |
| Comp. 2c | 90 | 200 | 140 | 10 | 1 | 20 | 4.3 | 0.6 | 0.16 | poor |

Example 3 (Pultrusion Tests)

Under N2 (dry nitrogen) inert gas, in a heated metal trough, at a temperature of 85° C. and a pressure of 1 bar (inert gas), woven carbon, glass or natural-fiber fabrics were pulled slowly for one minute through melted caprolactam containing 5 mol % sodium caprolactamate and 1 mol % N-acetylcaprolactam. After the one-minute impregnation, the impregnated fabric was introduced into a drying oven with the temperature T4, where it was left for 3 minutes. The dried-out fabric bundle was then subjected to subsequent heat treatment in a second drying oven at T5 for 20 minutes.

The results are collated below in Table 3.

| Example | T4 [° C.] | T5 [° C.] | Fabric | Appearance | Residual monomer [% by weight] |
|---|---|---|---|---|---|
| 3a | 150 | 120 | flax cord | good | 2.7 |
| 3b | 150 | 120 | glass fiber mat* | good | 2.65 |
| Comp. 3c | 190 | 120 | glass fiber mat* | discolored, poorly impregnated | 3.6 |
| Comp. 3d | 200 | 120 | carbon fiber mat | poorly impregnated | |
| 3e | 130 | 120 | carbon fiber mat | good | 2.5 |

*Size was removed by flaming

The invention claimed is:

1. A method for producing fiber-reinforced composite materials, wherein a multiplicity of continuous filaments or woven fabric is
   impregnated, optionally together with reinforcing materials, with a mixture comprising caprolactam and other starting materials for polyamide 6,
   passed through at temperatures of 70° to 100° C. that are above the melting temperature of the system,
   and thereafter, as a prepreg, cooled below the melting temperature of 70° C.,
   and subsequently anionically polymerized at temperatures of 100° to 160° C.,
   and repolymerized at temperatures of 90° to 170° C.

2. The method for producing a fiber-reinforced composite material according to claim 1, wherein repolymerization takes place at temperatures of 100° to 160° C.

3. The method for producing a fiber-reinforced composite material according to claim 1, wherein the continuous filaments are passed as a strand of fibers through a bath.

4. The method for producing a fiber-reinforced composite material according to claim 1, wherein an amount not to exceed 20% by weight of the caprolactam has been replaced by comonomers.

5. The method for producing a fiber-reinforced composite material according to claim 1, wherein mixtures of ε-caprolactam and ω-laurolactam are used.

6. The method for producing a fiber-reinforced composite material according to claim 1, wherein the impregnation of the filaments or woven fabric is carried out at a temperature of 70° to 100° C.

7. The method for producing a fiber-reinforced composite material according to claim 1, wherein continuous filaments of glass, carbon, aramid, steel, and/or ceramic are used.

8. The method for producing a fiber-reinforced composite material according to claim 7, wherein continuous filaments of aramid, steel, and/or ceramic are used.

9. The method for producing a fiber-reinforced composite material according to claim 1, wherein continuous filaments of glass, carbon, aramid, steel, ceramic and/or other temperature-resistant polymeric fibers or filaments are used.

10. The method for producing a fiber-reinforced composite material according to claim 9, wherein continuous filaments of aramid, steel, ceramic and/or other temperature-resistant polymeric fibers or filaments are used.

11. The method for producing a fiber-reinforced composite material according to claim 1, wherein high-modulus carbon fibers, silicatic and nonsilicatic glasses, carbon, boron, silicon carbide, metals, metal alloys, metal oxides, metal nitrides, metal carbides, and/or silicates are used as the fiber.

12. The method for producing a fiber-reinforced composite material according to claim 11, wherein high-modulus carbon fibers, boron, silicon carbide, metals, metal alloys, metal oxides, metal nitrides, metal carbides, and/or silicates are used as the fiber.

13. The method for producing a fiber-reinforced composite material according to claim 1, wherein polyacrylonitriles, polyesters, ultrastretched polyolefin fibers, polyamides, polyimides, aramids, liquid-crystal polymers, polyphenylene sulfides, polyether ketones, polyether ether ketones, polyetherimides, cotton, cellulose, flax, sisal, kenaf, hemp, and/or abaca, are used as the fiber.

14. The method for producing a fiber-reinforced composite material according to claim 13, wherein polyacrylonitriles, ultrastretched polyolefin fibers, polyimides, aramids, liquid-crystal polymers, polyphenylene sulfides, polyether ketones, polyether ether ketones, polyetherimides, cotton, cellulose, flax, sisal, kenaf, hemp, and/or abaca, are used as the fiber.

15. The method for producing a fiber-reinforced composite material according to claim 1, wherein the composite material comprises 40% to 80% by volume of fibers.

16. The method for producing a fiber-reinforced composite material according to claim 1, wherein anionic polymerization takes place at temperatures of 130° to 160° C.

17. A method for producing fiber-reinforced composite materials, wherein a multiplicity of continuous filaments or woven fabric is
  impregnated together with reinforcing materials, with a mixture comprising caprolactam and other starting materials for polyamide 6,
  passed through at temperatures of 70° to 100° C. that are above the melting temperature of the system,
  and thereafter, as a prepreg, cooled below the melting temperature of 70° C.,
  and subsequently anionically polymerized at temperatures of 100° to 160° C.,
  and repolymerized at temperatures of 90° to 170° C.

* * * * *